United States Patent
Tsai et al.

(10) Patent No.: US 8,873,232 B2
(45) Date of Patent: Oct. 28, 2014

(54) SUPPORTING FRAME FOR HARD DISK DRIVE

(75) Inventors: Ching-Hsiang Tsai, New Taipei (TW); Shih-Chi Liu, New Taipei (TW)

(73) Assignee: Ennoconn Corporation, New Taipei (TW)

(*) Notice: Subject to any disclaimer, the term of this patent is extended or adjusted under 35 U.S.C. 154(b) by 0 days.

(21) Appl. No.: 13/610,870

(22) Filed: Sep. 12, 2012

(65) Prior Publication Data

US 2013/0314868 A1 Nov. 28, 2013

(30) Foreign Application Priority Data

May 25, 2012 (TW) .............................. 101118665 A

(51) Int. Cl.
G06F 1/16 (2006.01)
G06F 1/18 (2006.01)

(52) U.S. Cl.
CPC ...................................... *G06F 1/187* (2013.01)
USPC ............... 361/679.38; 361/679.33; 312/223.2

(58) Field of Classification Search
CPC ........... G06F 1/181–1/187; G06F 1/16; G06F 1/1601; G06F 1/1607; G06F 1/1632; H05K 1/02; H05K 13/00; H05K 13/0413; H05K 5/0282; H05K 7/00
USPC ................ 361/79.02, 679.09, 679.21, 679, 2, 361/679.27, 679.22, 679.32–679.39, 361/724–727, 679.55–679.58; 312/223.1–223.2
See application file for complete search history.

(56) References Cited

U.S. PATENT DOCUMENTS

| | | | | |
|---|---|---|---|---|
| 7,679,896 B2* | 3/2010 | Deng et al. | ............... | 361/679.33 |
| 7,701,706 B2* | 4/2010 | Peng et al. | ............... | 361/679.37 |
| 7,701,707 B2* | 4/2010 | Peng et al. | ............... | 361/679.37 |
| 7,965,501 B2* | 6/2011 | Liang | ...................... | 361/679.37 |
| 8,259,441 B2* | 9/2012 | Chuang | ..................... | 361/679.37 |
| 2008/0098021 A1 | 4/2008 | Harada et al. | | |
| 2009/0141457 A1 | 6/2009 | Fujikawa | | |

FOREIGN PATENT DOCUMENTS

| | | | |
|---|---|---|---|
| JP | 11134063 A | 5/1999 | |
| JP | 2005038538 A | 2/2005 | |
| JP | 2009059463 A | 3/2009 | |
| WO | 2003017278 A1 | 2/2003 | |
| WO | 2008035410 A1 | 3/2008 | |

* cited by examiner

*Primary Examiner* — Anthony Haughton
*Assistant Examiner* — Ingrid Wright
(74) *Attorney, Agent, or Firm* — Novak Druce Connolly Bove + Quigg LLP

(57) ABSTRACT

A supporting frame is used to mount a hard disk drive to a storage rack. The storage rack forms two protrusions protruding inwards from opposite sides of the storage rack. The supporting frame includes a handle and two side brackets resiliently connected to the handle. The side brackets are fixedly attached to opposite sides of the hard disk drive. The handle defines two locking holes. The protrusions of the storage rack are respectively engaged in the locking holes. When the handle is moved away from the hard disk drive, the handle is deformed to disengage the protrusions of the storage rack from the locking holes of the handle.

9 Claims, 5 Drawing Sheets

SUPPORTING FRAME FOR HARD DISK DRIVE

BACKGROUND

1. Technical Field

The present disclosure relates to a supporting frame for a hard disk drive.

2. Description of Related Art

Electronic devices, such as computers, are generally equipped with a data storage device, such as a hard disk drive. Mounting the storage device to the electronic device by traditional screw type fasteners is inefficient and always requires tools, such as a screw driver.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
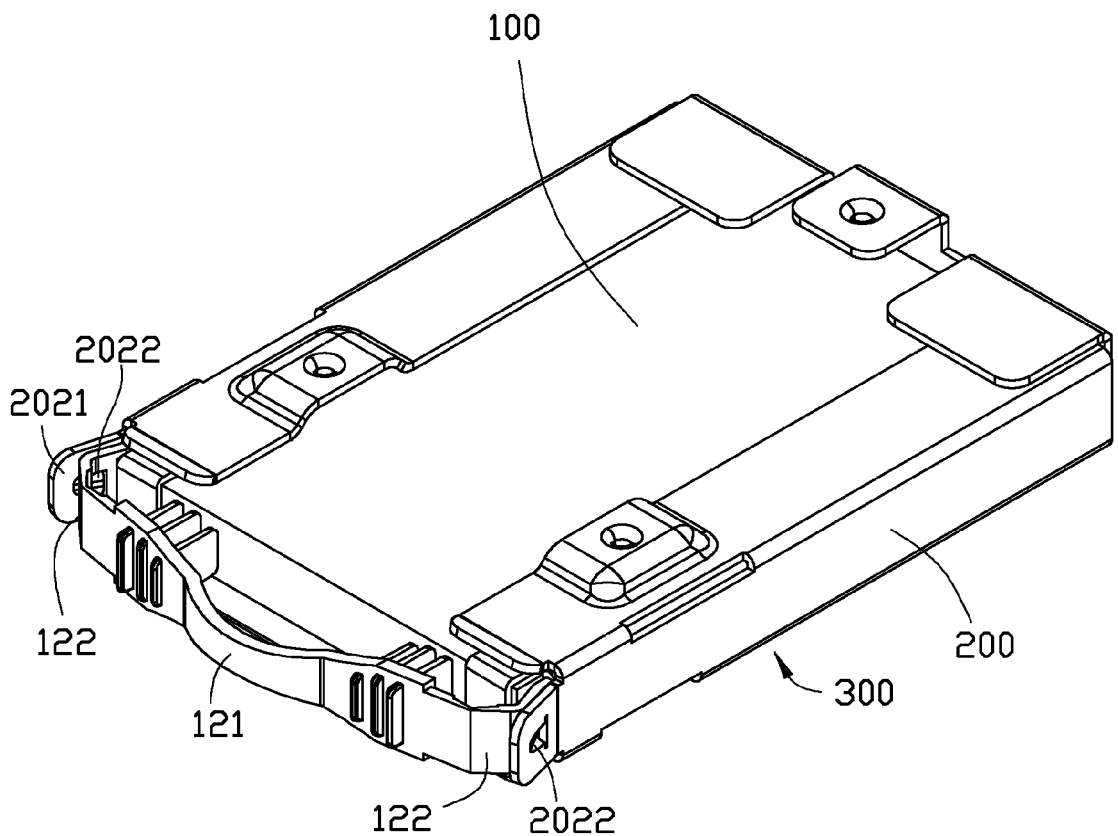
FIG. 1 is an isometric, assembled view of an exemplary embodiment of a supporting frame, a hard disk, and a storage rack.

FIG. 1 illustrates an exemplary embodiment of a supporting frame 300 is used to mount a hard disk drive 100 to a storage rack 200.

Figure 2:
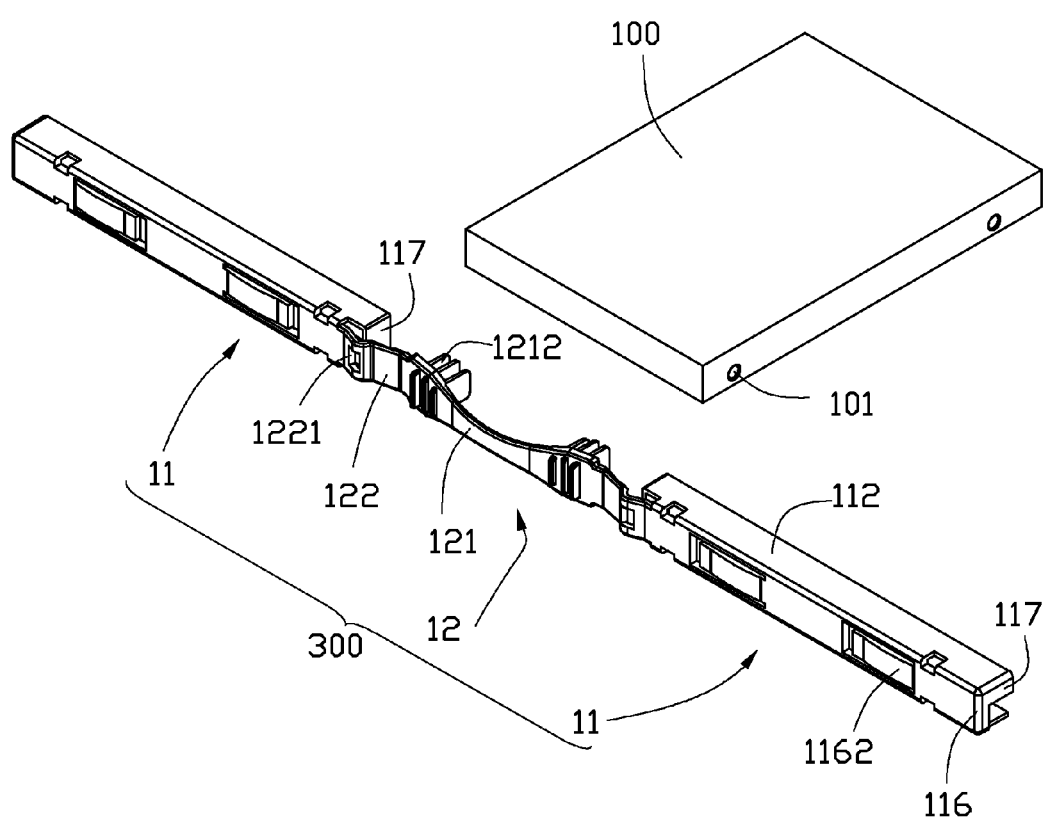
FIGS. 2 and 3 are isometric, exploded views of the supporting frame and the hard disk drive of FIG. 1, but viewed from different perspectives.
Figure 3:
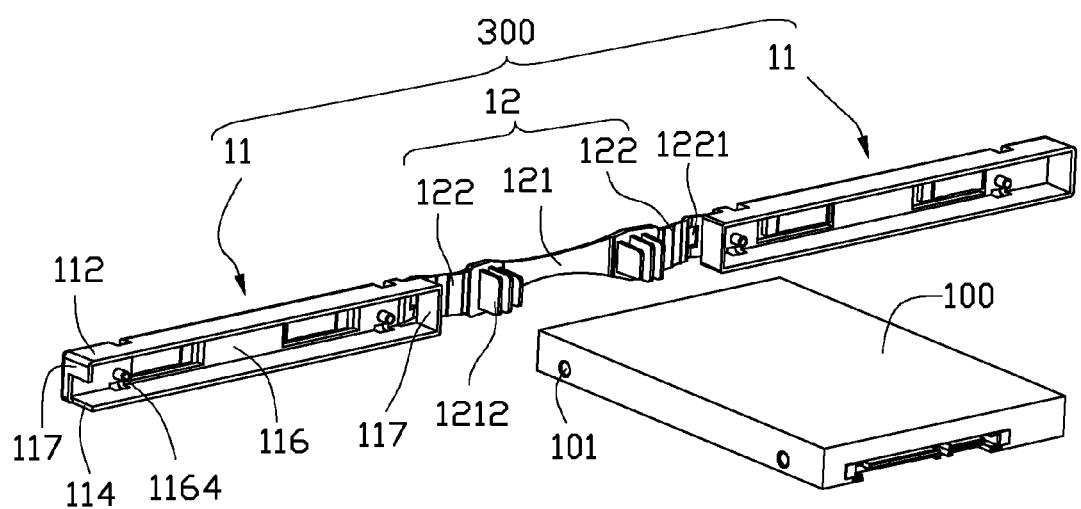

Each of the two opposite sides of the hard disk drive 100 defines two fixing holes 101 as shown in FIGS. 2 and 3. The supporting frame 300 is integrally formed with elastic material, and includes a handle 12 and two lengthwise side brackets 11 respectively extending from two opposite ends of the handle 12. In one embodiment, the supporting frame 300 is made with plastic or nylon. The two side brackets 11 are in-line with each other when the supporting frame 300 is restored. Therefore, the supporting frame 300 can be compactly stored to save accommodating space during transportation.

Each of the side brackets 11 includes a sidewall 116, an upper wall 112 perpendicularly extending from a top side of the sidewall 116, a lower wall 114 perpendicularly extending from a bottom side of the sidewall 116 in a same direction with the upper wall 112, two end walls 117 extending from opposite ends of the sidewall 116 and connected between corresponding ends of the upper and lower walls 112 and 114. A distance between inside surfaces of the upper and lower walls 112 and 114 is slightly less than a height of the hard disk drive 100. A distance between inside surfaces of the end walls 117 is slightly less than a length of the hard disk drive 100. Two arc-shaped resilient tabs 1162 are formed the sidewall 116 and protrude out of outsides of the sidewall 116. Two positioning pins 1164 extend from the inside surface of the sidewall 116. The handle 12 includes an arc-shaped grip 121, and two arc-shaped connection portions 122 extending from opposite ends of the grip 121. A plurality of abutting blocks 1212 is formed on the inside surface of the grip portion 121, adjacent to each of the connection portions 122. Each connection portion 122 defines a locking hole 1221.

Figure 5:
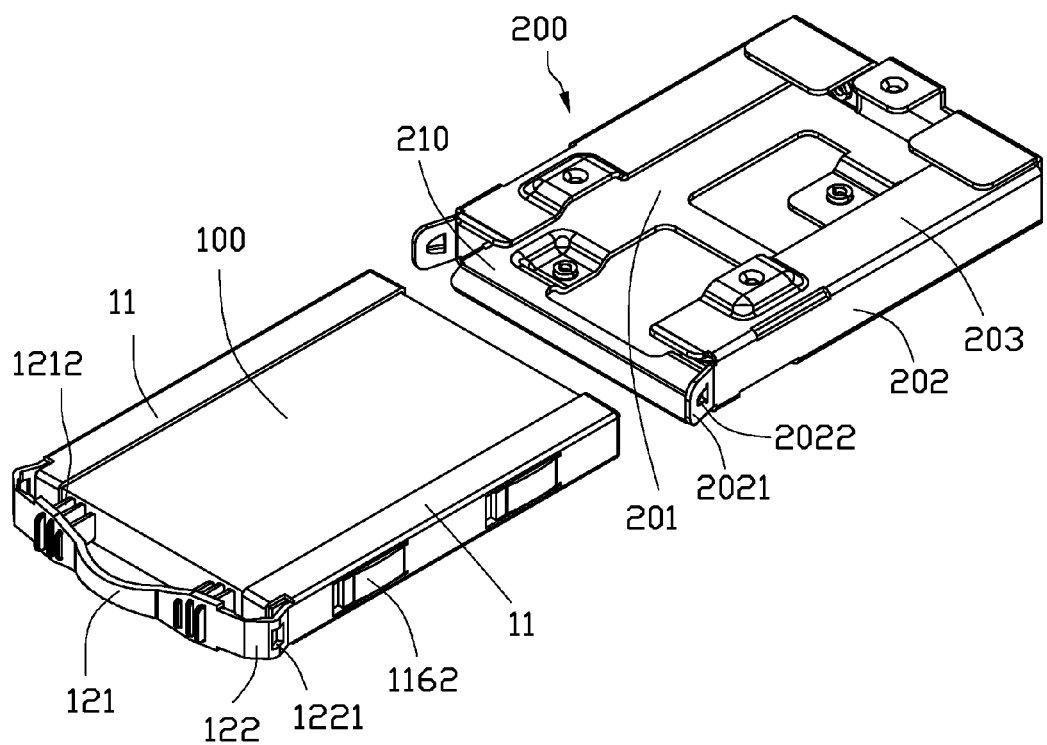
FIGS. 5 is a partially exploded view of FIG. 1.

Referring to FIG. 5, the storage rack 200 includes a bottom plate 201, two side plates 202 perpendicularly extending up from opposite sides of the bottom plate 201, and two top plates 203 perpendicularly extending from tops of the side plates 202 towards each other. The storage rack 200 defines an access 210 in a front end of the storage rack 200. A locking portion 2021 extends from a front end of each of the side plates 202 slantingly away from the other side plate 202. A protrusion 2022 protrudes inwards from each of the locking portions 2021.

Figure 4:
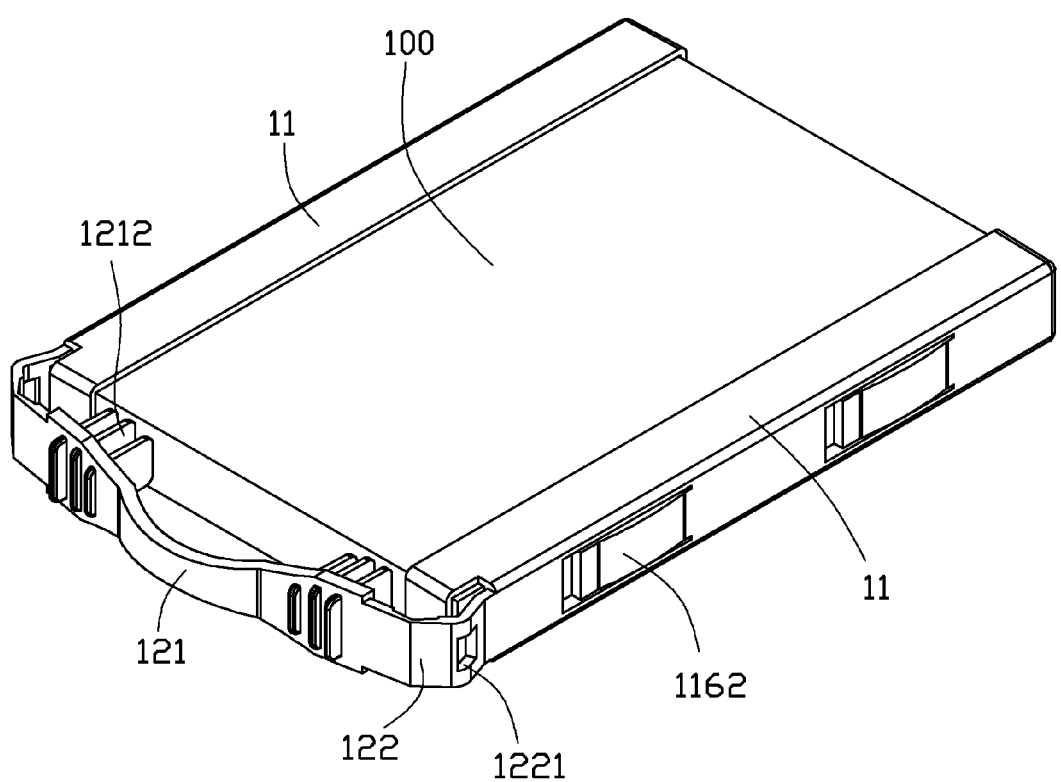
FIGS. 4 is an assembled, isometric view of FIG. 2.

Referring to FIGS. 1, 4, and 5, to mount the hard disk drive 100, the supporting frame 300 is bent to become U-shaped. The two slide frames 11 are attached to opposite sides of the hard disk drive 100, respectively. Parts of the hard disk drive 100 adjacent to opposite sides of the hard disk drive 100 are respectively received in the side brackets 11, with the positioning pins 1164 engaging in the corresponding fixing holes 101 of the hard disk drive 100. Because the distance between the inside surfaces of the upper and lower walls 112 and 114 is slightly less than the height of the hard disk drive 100, and the distance between the inside surfaces of the end walls 117 is slightly less than the length of the hard disk drive 100, the side brackets 11 are deformed by the hard disk drive 100 to tightly hold the hard disk drive 100. The abutting blocks 1212 of the handle 12 abut a front end of the hard disk drive 100, to keep an angle between the handle 12 and the sidewall 116 of each of the side bracket 11 greater than 90 degrees. The grip 121 of the handle 12 is manipulated to slide the supporting frame 300 together with the hard disk drive 100 into the storage rack 200 through the access 210, until the protrusions 2022 of the storage rack 200 correspondingly engage in the locking holes 1221 of the supporting frame 300. Therefore, the hard disk drive 100 is retained in the storage rack 200. The resilient tabs 1162 of the side bracket 11 of the supporting frame 300 abut the corresponding side plates 202 of the storage rack 200, for damping the shock to the hard disk drive 100.

To detach the hard disk drive 100 from the storage rack 200, the grip 121 of the handle 12 is moved forward to deform the handle 12. The connection portions 122 move inward to make the locking holes 1221 of the connection portions 122 disengage from the corresponding protrusions 2022 of the storage rack 200. Therefore, the supporting frame 300 together with the hard disk drive 100 is ready to be slid out of the storage rack 200 through the access 210.

It is to be understood, that even though numerous characteristics and advantages of the embodiment have been set forth in the foregoing description, together with details of the structure and function of the embodiment, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A supporting frame for mounting a hard disk drive in a storage rack which comprises a locking portion, the supporting frame comprising:

a handle comprising a grip and two connection portions extending from two opposite ends of the grip; and two lengthwise side brackets resiliently connected to distal ends of the connection portions opposite to the grip, to be attached to opposite sides of the hard disk drive;

wherein when the two side brackets are attached to opposite sides of the hard disk drive and the hard disk drive is received in the storage rack, one of the connection portions is operable to be locked to the locking portion of the storage rack, and the one connection portion is operable to be deformed to disengage from the storage rack in response to moving the grip of the handle away from the hard disk drive; and wherein the two side brackets are in-line with each other in response to the side brackets being restored.

2. The supporting frame of claim 1, wherein the supporting frame is integrally formed with plastic or nylon.

3. The supporting frame of claim 1, wherein the grip and the connection portions of the handle are arced out.

4. The supporting frame of claim 1, wherein at least one abutting block is formed on the handle to abut against a front end of the hard disk drive, to keep an angle between the handle and each of the side brackets greater than 90 degrees.

5. The supporting tray frame of claim 1, wherein at least one resilient tab extends from each of the side brackets to abut against the storage rack.

6. An assembly, comprising:

a hard disk drive;

a supporting frame comprising a handle, and two lengthwise side brackets extending from opposite ends of the handle, and attached to opposite sides of the hard disk drive; and a storage rack receiving the supporting frame and the hard disk drive, and comprising a locking portion locked to the handle of the supporting frame;

wherein the handle is deformable to disengage from the locking portion of the storage rack, the side brackets are resiliently connected to the handle, and are in-line with each other in response to the side brackets being restored.

7. The assembly of claim 6, wherein each of the side brackets comprises a sidewall, an upper wall perpendicularly extending from a top side of the sidewall, a lower wall perpendicularly extending from a bottom side of the sidewall in a same direction with the upper wall, and two end walls extending from opposite ends of the sidewall and connected between corresponding ends of the upper and lower walls, a distance between inside surfaces of the upper and lower walls is slightly less than a height of the hard disk drive, a distance between inside surfaces of the end walls is slightly less than a length of the hard disk drive, the side brackets are deformed to hold the hard disk drive, in response to parts of the hard disk drive adjacent to the opposite sides of the hard disk drive being respectively received in the side brackets.

8. The assembly of claim 7, wherein a plurality of fixing holes is defined in the opposite sides of the hard disk drive, a plurality of positioning pins extends from the sidewalls of the side brackets to correspondingly engage in the fixing holes of the hard disk drive.

9. The assembly of claim 6, wherein two locking holes are defined in the handle of the supporting frame, respectively adjacent to the side brackets, the storage rack comprises two opposite side plates, a locking portion extends from an end of each of the side plates slantingly away from the other side plate, a protrusion protrudes inwards from each of the locking portions, the protrusions engage in the locking holes of the handle of the supporting frame.

* * * * *